United States Patent [19]

Wilde

[11] 4,055,084
[45] Oct. 25, 1977

[54] LIQUID FLOW METER CONSTRUCTION

[76] Inventor: Hans Wilde, Bubenhalde 92, Stuttgart 30, Germany, D-7000

[21] Appl. No.: 703,584

[22] Filed: July 8, 1976

[51] Int. Cl.² .................................................. G01F 11/14
[52] U.S. Cl. ....................................................... 73/249
[58] Field of Search .............. 73/220, 239, 249, 250, 73/271

[56] References Cited

U.S. PATENT DOCUMENTS

| 160,767 | 3/1875 | Guthrie | 73/271 |
| 1,470,684 | 10/1923 | Cade | 73/250 |
| 1,637,850 | 8/1927 | Bassler | 73/250 |
| 3,344,667 | 10/1967 | Maltby | 73/239 |

*Primary Examiner*—Herbert Goldstein
*Attorney, Agent, or Firm*—McGlew and Tuttle

[57] ABSTRACT

A liquid flow meter comprises a housing having a cylindrical piston chamber and a control chamber. A measuring piston is movable in the piston chamber and a flow control slider is movable in the control chamber and it has respective oppositely directed control surfaces which are made effective, by the flow of liquid between the inlet to the housing and a communication between the measuring piston chamber and the control chamber to move the control slider in a control direction. At each end position of the slider, there is a magnetic holding device for holding the slider until a predetermined control pressure is brought to bear against it to move it in an opposite direction. At each limit of its movement, the piston engages and charges an energy or power storage device operable to accelerate its movement in the opposite direction. The control movements of the slider for regulating the flow between the inlet and the outlet are varied in accordance with the position of the measuring piston.

12 Claims, 2 Drawing Figures

LIQUID FLOW METER CONSTRUCTION

FIELD AND BACKGROUND OF THE INVENTION

This invention relates in general to the construction of devices for controlling the flow of fluids and, in particular, to a new and useful device for continuously measuring the rate of flow of a liquid flowing from a supply tank to a consuming device.

DESCRIPTION OF THE PRIOR ART

With the increasing scarcity of mineral oil products and the high prices therefor, it becomes necessary to effect the exact monitoring of the fuel consumption in consuming devices, such as motor vehicles, heating devices and similar operating devices in order to effect an economy of consumption and the elimination of waste. For this purpose, flow meters are needed which indicate the rate of flow accurately even at very low consumption rates and which are responsive to small differences in hydraulic pressure between the inlet and outlet of such devices. The standard values to be assumed for the required measuring performance may be a rate of flow of approximately 1 liter per hour with a response pressure of about 30 cm water column, and an accuracy of measurement of at least ± 2%. Numerous types of flow meters are known which are based on various principles. They do not, however, comply with the requirements as to minimum pressure of response, accuracy of measurement and measurable minimum rate of flow mentioned above.

SUMMARY OF THE INVENTION

The present invention provides a flow meter having satisfactory operating characteristics, and it includes a housing having a measuring chamber in which is movable a measuring piston. The measuring piston influences the position of a reversing control member for regulating the flow through the device and which advantageously includes means for counting the piston strokes.

In accordance with the invention, a high precision of measurement is obtained primarily by a high accuracy provided at the reversal of the measuring piston at the end of its stroke. For this purpose, the reversing control member is equipped with a retaining device by which the control member is retained in its end position up to the accomplishment of the full stroke of the measuring piston and then it is suddenly released so that it can move instantly into its opposite end position. During the reversing operation, the supply and discharge of the liquid to be measured are shut off.

The retaining device may advantageously comprise a locking mechanism with a linkage, an electrically actuated arrest, or, preferably, a magnetic device, which is engageable with the control slider in each end position. A particularly satisfactory solution with respect to simplicity, reliability and service life is the use of permanent magnets for retaining the control member in the respective end positions.

According to a feature of the invention, in order to release the retaining device of the control member for initiating the reversal, there is a means for accumulating potential energy mounted at each end of the stroke path of the measuring piston. Preferably, this means comprises springs against which the measuring piston or a part connected thereto is pushed at each end position at the end of the stroke. In this manner, the spring or other element is increased in tension until the measuring piston abuts against a stop. Thereby, a back pressure builds up in the piston chamber which is actively effective during the respective strokes and which increases rapidly as the measuring piston abuts against the stop. This pressure acts on the retained end of the control slider until the holding force of the permanent magnet is overcome or it releases a similar locking device. Thereupon, because of the accumulated potential energy, the reversing control member is pushed back toward its other end position where it is retained again by another magnet or similar locking device.

Instead of springs, a small pressure accumulator with an air cushion or similar arrangement may be employed. In addition, a similar effect may be obtained by replacing the springs by permanent magnets of suitable polarity or by use of electromagnets. For example, one of the magnets may be provided on the front face of the measuring piston and one on the front face of the measuring cylinder.

A construction particularly favorable from the hydraulic point of view is obtained by designing the reversing control member as a control slide valve which comprises a cylindrical piston with annular grooves defining respective oppositely directed control surfaces which may be operated on by the circulating liquid. The control member slides in a control chamber which has walls which define with the control slide valve, flow control passage means between the inlet and outlet to the housing. A concentrically positioned annular retaining magnet provided in one of the front faces of the control slider makes it possible to provide a magnetically actuable contact concentrically projecting into the slider control chamber and which is actuated by the stroke of the slider to count the number of strokes, for example, by use of an electromagnetic counter.

A particular advantage of the hydraulic reversal of the control slider is that, at the start of the slider motion, and inlet and outlet passageways are closed and, during the further reversing motion, no leakage can occur and a high measuring accuracy is ensured even with very small rates of flow. In addition, it is sufficient to connect the control part and the measuring part to each other only hydraulically and they may be arranged in any mutual spacial relationship for this purpose.

In a preferred embodiment, the measuring cylinder and the control member are aligned along a common rotational axis so that a compact design is obtained which frequently permits the mounting of the flow meter at any desired location.

The desired stroke volumes may be adjusted in a simple manner during operation and very accurately by means of an adjusting device projecting centrally into the measuring cylinder and limiting the stroke of the measuring piston. This makes it unnecessary to work the length and diameter of the measuring cylinder with highest precision.

The invention also makes it possible to effect measurement of partial quantities of the stroke volume. For such a purpose, switching means, such as contacts, radiation paths, sensors or the like, are provided along the stroke path of the measuring piston and these are made responsive to the particular location of the piston to actuate certain control circuits for indications or recording devices.

Accordingly, it is an object of the invention to provide a liquid flow meter which includes a housing having a cylindrical piston chamber, and a control chamber with a measuring piston movable in the piston chamber and a flow control slider movable in the control chamber and which has control surfaces which are influenced to move the slider in either of two directions in accordance with the position of the piston so as to control the flow of liquid through the device and through the piston chamber and the control chamber and which also includes retaining means, such as a magnet, at each end position of the control member so as to retain the control member in the end positions until a predetermined control pressure acts thereon to move it in a reversing direction.

A further object of the invention is to provide a liquid flow meter which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
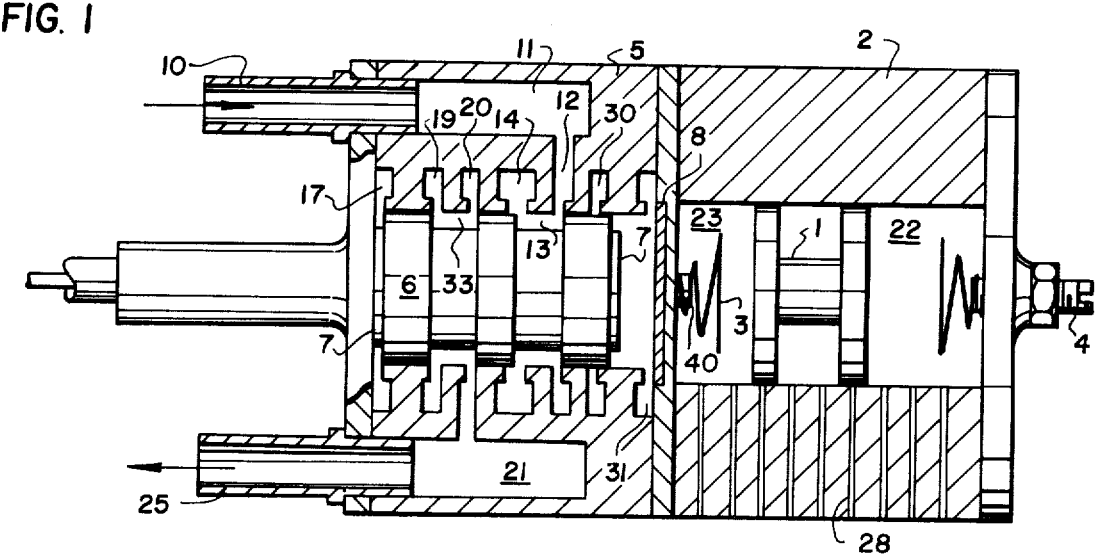
FIG. 1 is a longitudinal sectional view of a liquid flow meter constructed in accordance with the invention.
Figure 2:
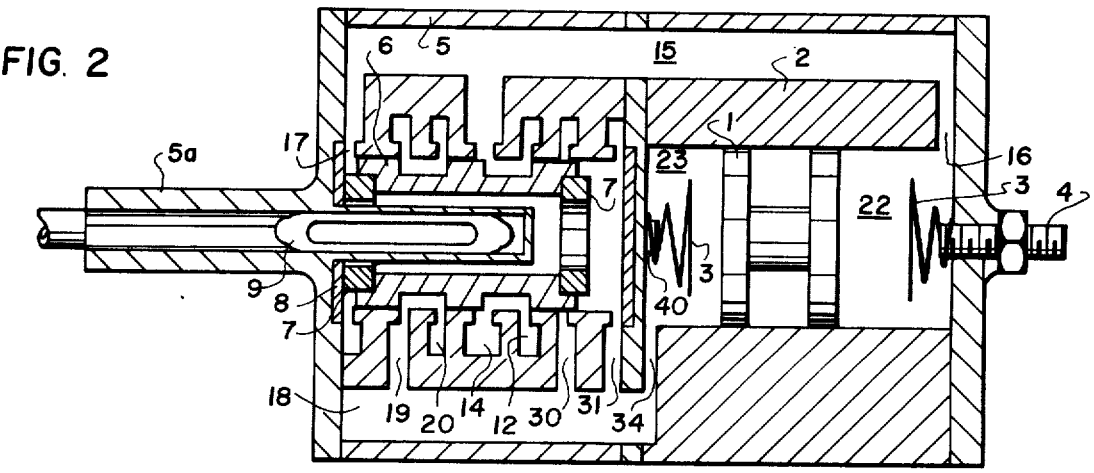
FIG. 2 is a view similar to FIG. 1 but at a right angle to the section shown therein.

Referring to the drawings in particular, the invention embodied therein in FIGS. 1 and 2, comprises a flow meter which has a housing 2 forming a cylinder with a piston chamber having a measuring piston 1 slidable therein. The stroke of the piston may be controlled by an adjusting device 4. During movement of piston 1 toward each end position, it engages with a compressible coil spring 3 to pretension this coil spring and, thereafter, it engages against a stop 40. Housing 2 also includes a cylindrical portion 5 defining a control chamber in which a control slider 6 is movable. Slider 6 is provided with annular grooves so as to define control surfaces which face in respective opposite directions and which may be acted upon by the fluid which is brought in through an inlet 10 to the housing and circulated through the housing between the measuring chamber and the control chamber and flow passage control means to an outlet 25. A permanent magnet 7 is associated with each end of the control slider and it cooperates with a ferromagnetic armature plate 8 to retain the slider in each end position of its movement until a fluid pressure force acting on the control surfaces overcomes this retention force and moves it rapidly in an opposite direction. The housing portion 5 includes a tubular part 5a which accommodates a guard tube contact 9 which may be actuated during the movement of the control slider to the various reverse operating positions in order to provide a counting or other control signal associated with operating the device.

A liquid to be measured, such as gasoline, oil or a similar material, flows from a pump, which has not been shown, through the inlet connection 10 into a bore 11 defined in the housing and, therefrom, it flows through passageways or annular grooves 12, 13 and 14 into a bore 15, as seen in FIG. 2, from where it passes through the channel 16 into the righthand chamber portion 22 of measuring cylinder 2. In consequence, piston 1 is driven to the lefthand side. The bores and passageways 11, 15, 21 and 18 are offset relative to each other by about 90°. During the motion of piston 1 to the left side, the liquid to be measured flows from the left cylinder chamber 23 through passages 34, 18, 19, 33, 20 and 21, to the outlet 25. All of these passages and control grooves define flow control passage means in the housing.

At the end of the travel of the measuring piston to the lefthand side, it will engage the left spring 3 and tension the spring and compress it until it abuts against the stop 40. This causes a back pressure in chamber 22 which increases, at first gradually, and then suddenly. The back pressure becomes effective also in channel 17 where it acts on the left end face of the control slider 6 in a direction opposite to the retaining force which is effective between the left magnet 7 and the associated armature plate 8. As soon as the back pressure exceeds the retaining force of the magnet 7, slider 6 is torn loose and moved in the direction of its opposite end position. During this travel, the control slider 6 shuts off the communication between groove 13 and channel 14, on the one hand, and outlet passages 33, 20, on the other hand.

The left spring 3 pushes measuring piston 1 to the right while the control slider 6 is also further pushed to its righthand end position hydraulically. The slider is again retained magnetically. The supply to and the discharge from the cylinder chambers is open again and a new supply is directed through passages 10, 11, 12, 13, 30, 18 and 34, into chamber 23, and the back pressure builds up at 31. The discharge follows the path from chamber 22 through 16, 15, 14, 33, 20 and 21 to the outlet 25. As soon as the measuring piston 1 reaches its righthand end position, the cycle of increasing the spring tension and the hydraulic pressure in the flow passage control means is repeated to effect a tearing loose of the magnetic connection and reversal of the control slider once again. The stroke of measuring piston 1 is adjusted very accurately by the adjusting means including the setscrew 4.

Left hand permanent magnet 7 may have, in addition, another function, that is, it may be used for actuating a counter contact. For this purpose, the guard tube contact 9 is provided which projects through left hand magnet 7 into the interior of control slider 6 so that each time the magnet moves past the contact, the contact is actuated. The number of contact actuations is an exact measure, therefore, of the liquid volume which has passed through the measuring cylinder.

Should it be desired to measure partial quantities of the stroke volume of the piston, index cards, contacts, passages for light paths, pulse transmitters or the like may be provided in the stroke path of the measuring piston, such as the light passages 28 which are defined in the cylinder 2 along the length of piston 1.

The measuring piston may also be designed as a diaphragm piston. In such a case, the diaphragm divides the piston cylinder into two chambers and its deflection from the central position acts in the same manner as the reciprocating piston.

Figure 3:
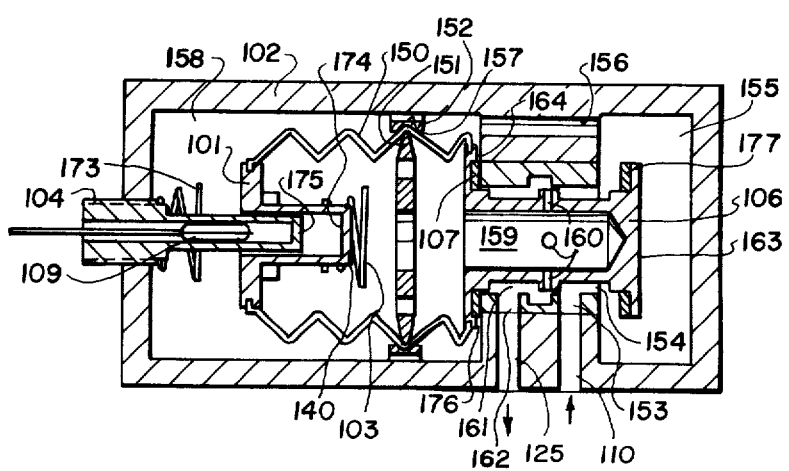
FIG. 3 is a view similar to FIG. 1 of another embodiment of the invention.

In the embodiment shown in FIG. 3, there is a closed housing 102 and a piston 101 is mounted for reciprocating motion within the housing. In this embodiment, the righthand end of the piston 101 is sealed off relative to the housing by a means of a diaphragm or bellows 150. Diaphragm 150 is held in position by means of an apertured disc 151 by which a portion of the diaphram is clamped into a support 152. Diaphragm 150 extends up to a circular groove type control slider 106 to which the diaphragm is secured at the side remote from piston 101 and disc 151. The lefthand pressure chamber of piston 101 is limited by housing 102.

In the indicated position, the fluid flows into housing 102 at inlet 110 and it passes into a circular channel 153 and into a groove 154 of slider 106, and it flows to the inside space 155 of the housing and into bores 156 and 157 as well as into the space 158 where the fluid acts on a lefthand surface of the piston 101 and moves the piston to the right until piston 101 abuts, first by a spring 103, and then, by a stop surface 140, against the disc 151 which is firmly positioned in the housing. The fluid present in the righthand pressure chamber of piston 101 passes through apertured disc 151 and bores 159 and 160 into grooves 161 and 162 and, therefrom, through a bore 125 to the outside of the housing 102 where it is delivered to a location of use.

As soon as piston 101 reaches the right hand end of its stroke and cannot move any further, the fluid pressure increases and the differential pressure acts on the front surface 163 of the slider 106 and urges the slider to the left. At the same time, the fluid pressure acts on a circular surface 164 in the same direction. Initially, however, the slider is still retained by a permanent magnet 107 until the pressure in space 155 increases to the desired value and tears the slider loose and moves it to the left.

Consequently slider 106 is moved to the left and, thereby reversed, so that now the fluid can act through passages 110, 153, 154, 160 and 159 on the righthand surface of the piston. There is no creeping transition at the reversal and the piston is torn loose and immediately moves quickly in the new direction which is thus to the left until it abuts against a spring 173 and then, by its surface 174, against a fixed surface 175. A spring 103, which has been tensioned while butting against disc 151, accelerates the motion of the piston 101. The fluid present in the pressure chamber at the righthand side of the piston passes through circular slot 176 into the grooves 161 and 162 and, therefrom, through bore 125 to the outside. The pressure in spaces 155 and 158 drops. As soon as piston 101 attains the left hand end of its stroke, the pressure increases in the space enclosed by the diaphragm. Slider 106 is moved to the right and reverses the flow of the fluid and the position shown in the drawing is restored once again and a new operational cycle starts.

A permanent magnet 177 retains the slider 106 initially again in its left hand end position until the desired pressure is attained so that, similar to the first embodiment, a sudden reversal is obtained, while any creeping transition is eliminated. In this embodiment, the stroke of piston 101 can be very accurately adjusted by means of a screw 104 comprising stop surface 175. Screw 104 accommodates a switch 109 which is connected to a counter (not shown) by which the number of strokes is counted and, thereby, the rate of flow of the fluid is measured.

While specific embodiments of the invention have been shown and described in detail to illustrate the application of the principles of the invention, it will be understood that the invention may be embodied otherwise without departing from such principles.

What is claimed is:

1. A liquid flow meter comprising, in combination, a measuring chamber; a measuring member reciprocable in said measuring chamber between two limit position; a control chamber having an inlet and outlet for the liquid to be measured; a control slide reciprocable in said control chamber and formed with control passages for the measured liquid; passage means interconnecting said measuring and control chambers so that the liquid to be measured flows, under dynamic pressure, from said inlet through said control passages and through said measuring chamber to reach said outlet; said control slide being movable between two end positions in each of which said control passages direct fluid under dynamic pressure to a different respective end of said measuring member to reverse the movement of said measuring piston; said control slide, when said measuring piston is stopped in either of its limit positions with said control slide in one of its end positions, being moved, under the effect of the dynamic pressure of the measured liquid, to its opposite end position to effect reverse movement of said measuring piston; a counter operable responsive to reciprocation of one of said measuring piston and said control slide; and respective power accumulators, operable to store energy responsive to motion of said measuring piston, in said measuring chamber at each limit position of said measuring member, said power accumulators accelerating said measuring member during initiation of reversal of its motion.

2. A liquid flow meter, according to claim 1, wherein said flow control passage means are constructed so that during the rapid movement of said control slider from one end position to the other, the supply into and discharge from said flow meter are shut off.

3. A liquid flow meter, according to claim 1, including sensing means arranged along the path of travel of said measuring piston for indicating the partial volumes in accordance with the piston position.

4. A liquid flow meter, as claimed in claim 1, in which said power accumulators comprise springs mounted in said measuring chamber coaxially of said measuring piston and compressible by said measuring piston at its respective limit positions.

5. A liquid flow meter, as claimed in claim 1, including respective retaining means at each end position of said control slide releasably operated to retain said control slide in the associated end position; said retaining means being released responsive to an increase in the value of the dynamic pressure of the measured fluid to a value sufficient to overcome the retaining force of said retaining means, whereupon said retaining means are released for unrestricted movement of said control slide under the dynamic pressure to its opposite end position.

6. A liquid flow meter, according to claim 5, wherein said control slide comprises a rod member having a plurality of spaced axial rings with grooves therebetween, the rings defining respective oppositely directed control surfaces, said retaining means comprising a permanent magnet on said slide and a ferromagnetic armature plate in said control chamber engageable with said magnet.

7. A liquid flow meter, as claimed in claim 6, wherein said retaining means includes an annular magnet on said control slide; and a counter contact member disposed along the path of movement of said control slide and operable by said annular magnet.

8. A liquid flow meter, according to claim 5, wherein said retaining means comprises electromagnets which are actuated as a function of the position of the measuring piston.

9. A liquid flow meter, as claimed in claim 5, wherein said control slide has respective oppositely directed control surfaces and which are subject to such dynamic pressure; said piston being a double-acting piston; said flow passage means including a connection between the respective pressurized sides of said measuring chamber with said control chamber for delivering a control dynamic pressure to a respective control surface of said control slide for moving said control slide away from said retaining means.

10. A liquid flow meter, as claimed in claim 6, in which said measuring chamber and said control chamber are co-axial cylinders arranged in end-to-end axial alignment; said control slide and said piston being also arranged in end-to-end axial alignment.

11. A liquid flow meter, according to claim 10, including an adjusting device comprising a setscrew threadable in an end face of said measuring chamber for limiting the stroke of said measuring piston.

12. A liquid flow meter, as claimed in claim 1, in which said measuring chamber and said control chamber are arranged in co-axial end-to-end axial alignment in a common housing; an apertured disc positioned in said common housing; a bellows secured at one end to said measuring piston and enclosing said measuring piston, said bellows being secured, intermediate its ends, to said apertured disc, and having its opposite end secured to said control slide beyond said apertured disc.

* * * * *